(12) United States Patent
Earnhart et al.

(10) Patent No.: US 9,838,259 B1
(45) Date of Patent: Dec. 5, 2017

(54) METHODS FOR MANAGING CLIENT DEFINED RESPONSE REQUIREMENTS IN DNS QUERY AND DEVICES THEREOF

(71) Applicant: F5 Networks Inc., Seattle, WA (US)

(72) Inventors: Michael Earnhart, Seattle, WA (US); Brent Blood, Seattle, WA (US); George Michael Lowell, Jr., Seattle, WA (US); Nat Thirasuttakorn, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 178 days.

(21) Appl. No.: 14/203,230

(22) Filed: Mar. 10, 2014

Related U.S. Application Data

(60) Provisional application No. 61/775,279, filed on Mar. 8, 2013.

(51) Int. Cl.
  *G06F 15/173* (2006.01)
  *H04L 12/24* (2006.01)

(52) U.S. Cl.
  CPC .............................. *H04L 41/0893* (2013.01)

(58) Field of Classification Search
  CPC . H04L 45/741; H04L 61/2557; H04L 61/251; H04L 61/1511; H04L 61/2076; H04L 61/304; H04L 61/6059; H04L 45/74
  See application file for complete search history.

(56) References Cited

U.S. PATENT DOCUMENTS

| 8,352,618 | B2   | 1/2013 | Perez |
|-----------|------|--------|-------|
| 2006/0095585 | A1* | 5/2006 | Meijs ................. H04L 12/4633 709/245 |
| 2010/0138551 | A1* | 6/2010 | Degaonkar ....... H04L 29/12066 709/228 |

(Continued)

FOREIGN PATENT DOCUMENTS

WO       2011791982 A2    6/2011

OTHER PUBLICATIONS

F5 Networks, Inc., "Managing IPv6 in Service Provider Networks with BIG-IP Devices", Solution Profile, Apr. 4, 2011, pp. 1-2, www.f5.com.

(Continued)

*Primary Examiner* — Cheikh Ndiaye
(74) *Attorney, Agent, or Firm* — LeClairRyan, a Professional Corporation

(57) ABSTRACT

A method, non-transitory computer readable medium and an application traffic manager computing device for determining whether a received query from a client computing device to resolve a hostname comprises a domain name with a value indicating type of internet protocol version. The received query is processed by truncating a portion of the domain name with the value indicating type of internet protocol version from the received query when the domain name with the value indicating type of internet protocol version is determined to be present. An internet protocol address is received from at least one of a plurality of servers based on the truncated portion of the domain name with the value indicating type of internet protocol version. The format of the received internet protocol address is determined for conforming to one or more policies. One or more actions are performed based on the determination.

24 Claims, 4 Drawing Sheets

(56) References Cited

U.S. PATENT DOCUMENTS

2011/0153827 A1\* 6/2011 Yengalasetti ......... G06F 9/5044
709/226
2011/0153831 A1\* 6/2011 Mutnuru ........... H04L 29/12066
709/226

OTHER PUBLICATIONS

F5 Networks, Inc., "Carrier-Grade NAT and IPv6 Gateway", Solution Profile, Aug. 6, 2012, pp. 1-2, www.f5.com.
Murphy, A., "Managing IPv6 Throughout the Application Delivery Network", White Paper, F5 Networks Inc., Jun. 5, 2012, pp. 1-10, www.f5.com.

\* cited by examiner

METHODS FOR MANAGING CLIENT DEFINED RESPONSE REQUIREMENTS IN DNS QUERY AND DEVICES THEREOF

This application claims the benefit of U.S. Provisional Patent Application Ser. No. 61/775,729 filed on Mar. 8, 2013, which is hereby incorporated by reference in its entirety.

FIELD

This technology generally relates to methods and devices for network management and, more particularly, to methods for managing client defined response requirements in DNS query and devices thereof.

BACKGROUND

A domain name system is a hierarchical naming system for computers, services, or any resource connected to the internet or a private network. A domain name service resolves queries for these names into IP addresses for the purpose of locating computer services and devices worldwide. IP addresses are mainly in the internet protocol version 4 (IPv4) format, but internet protocol version 6 (IPv6) format was developed to deal with long-anticipated problem of IPv4 running out of addresses.

However, existing applications running on computing devices were developed to communicate in IPv4 format and many applications running on computing devices do not function with the IPv6 format. Additionally, most of the present operating systems fully support IPv4 and to some extent IPv6 formats.

In the transition phase from IPv4 to IPv6, there are numerous situations when the client resolvers send queries for an internet protocol address to a DNS resolver higher in the DNS hierarchy and this DNS resolver fails to manage these queries as the DNS resolver was not sure of the desired or appropriate format of the internet protocol address which had to be sent back to the querying computing devices.

The problem illustrated above is solved in the existing technologies by hard coding an IP address in the IPv4 format and thus avoiding sending it to the DNS resolver. However, the disadvantage of this hard-coding is that without the DNS resolver, any updates to the IP address could not be made.

SUMMARY

A method for managing client defined response requirements in a domain name system query including determining by an application traffic manager computing device whether a received query from a client computing device to resolve a hostname comprises a domain name with a value indicating type of internet protocol version. The received query is processed by the application traffic manager computing device by truncating a portion of the domain name with the value indicating type of internet protocol version from the received query when the domain name with the value indicating type of internet protocol version is determined to be present. An internet protocol address is received by the application traffic manager computing device from at least one of a plurality of servers based on the truncated portion of the domain name with the value indicating type of internet protocol version. The format of the received internet protocol address is determined for conforming to one or more policies by the application traffic manager computing device. One or more actions are performed by the application traffic manager computing device based on the determination.

A non-transitory computer readable medium having stored thereon instructions for managing client defined response requirements in a domain name system query comprising machine executable code which when executed by at least one processor, causes the processor to perform steps including determining whether a received query from a client computing device to resolve a hostname comprises a domain name with a value indicating type of internet protocol version. The received query is processed by truncating a portion of the domain name with the value indicating type of internet protocol version from the received query when the domain name with the value indicating type of internet protocol version is determined to be present. An internet protocol address is received from at least one of a plurality of servers based on the truncated portion of the domain name with the value indicating type of internet protocol version. The format of the received internet protocol address is determined for conforming to one or more policies. One or more actions are performed based on the determination.

An application traffic manager computing device including at least one of configurable hardware logic configured to be capable of implementing or a processor coupled to a memory and configured to execute programmed instructions stored in the memory for determining whether a received query from a client computing device to resolve a hostname comprises a domain name with a value indicating type of internet protocol version. The received query is processed by truncating a portion of the domain name with the value indicating type of internet protocol version from the received query when the domain name with the value indicating type of internet protocol version is determined to be present. An internet protocol address is received from at least one of a plurality of servers based on the truncated portion of the domain name with the value indicating type of internet protocol version. The format of the received internet protocol address is determined for conforming to one or more policies. One or more actions are performed based on the determination.

This technology provides a number of advantages including providing a method, non-transitory computer readable medium and apparatus that assists with managing client defined response requirements in a domain name system query. By truncating and process the received DNS queries, this technology provides an efficient and reliable process to determine whether to forward the received query to the DNS server. Additionally, upon receiving the response from the DNS server, this technology provides the flexibility to alter the received response, reject the received response or provide the response to the querying client device.

DETAILED DESCRIPTION

Figure 1:
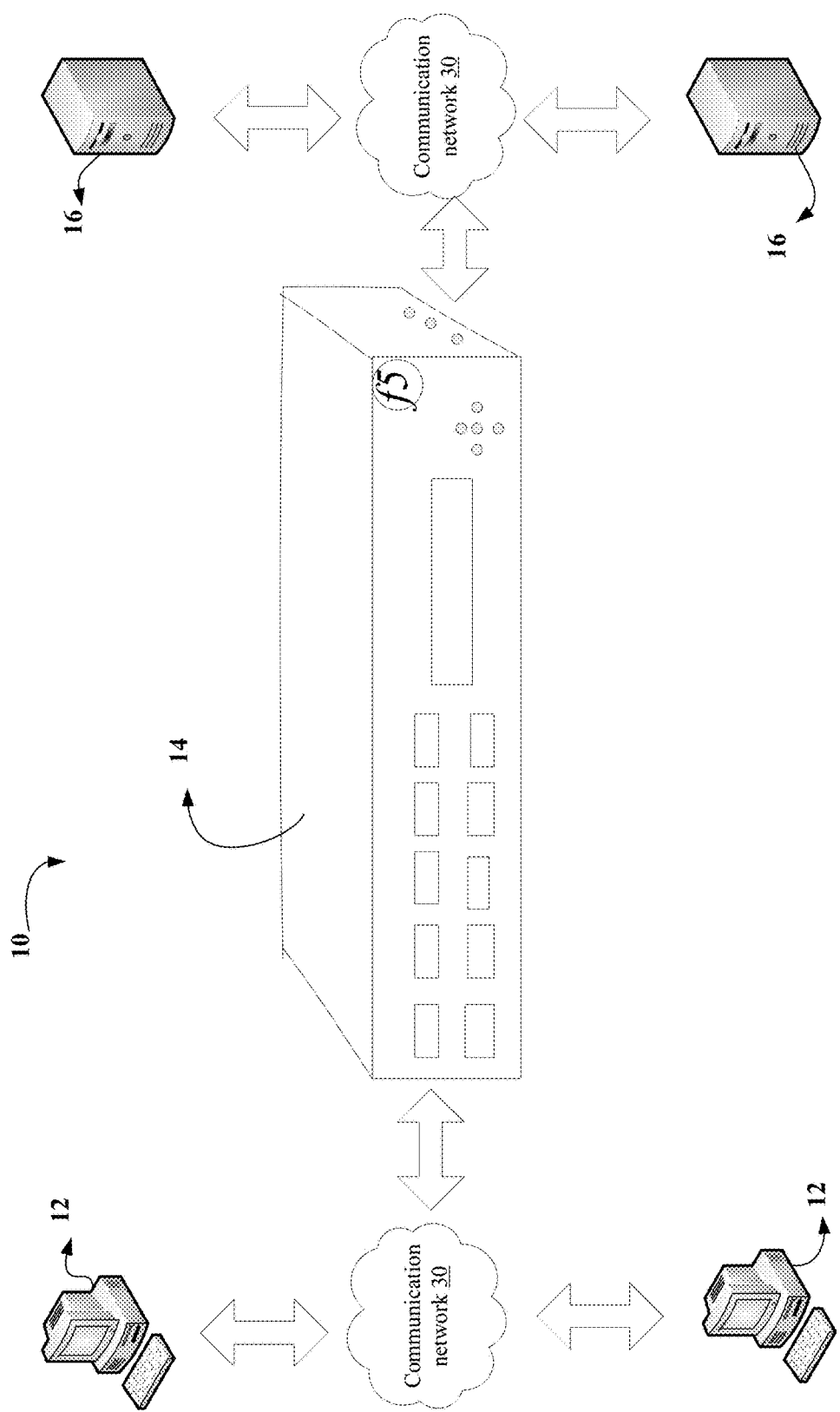
FIG. 1 is a block diagram of an exemplary network environment with an application traffic manager computing device for managing client defined response requirements in DNS query.

An exemplary network environment 10 with an application traffic manager computing device 14 for managing client defined response requirements in DNS query is illustrated in FIG. 1. The exemplary environment 10 includes plurality of client computing devices 12, the application traffic manager computing device 14, and a plurality of servers 16 which are coupled together by communication network 30, although the environment can include other types and numbers of systems, devices, components, and/or elements and in other topologies and deployments. While not shown, the exemplary environment 10 may include additional network components, such as routers, switches and other devices, which are well known to those of ordinary skill in the art and thus will not be described here. This technology provides a number of advantages including managing client defined response requirements in DNS query.

Referring more specifically to FIG. 1, application traffic manager computing device 14 is coupled to the plurality of client computing devices 12 through the communication network 30, although the plurality of client computing devices 12 and application traffic manager computing device 14 may be coupled together via other topologies. Additionally, the application traffic manager computing device 14 is coupled to the plurality of servers 16 through the communication network 30, although the plurality of servers 16 and application traffic manager computing device 14 may be coupled together via other topologies.

Figure 2:
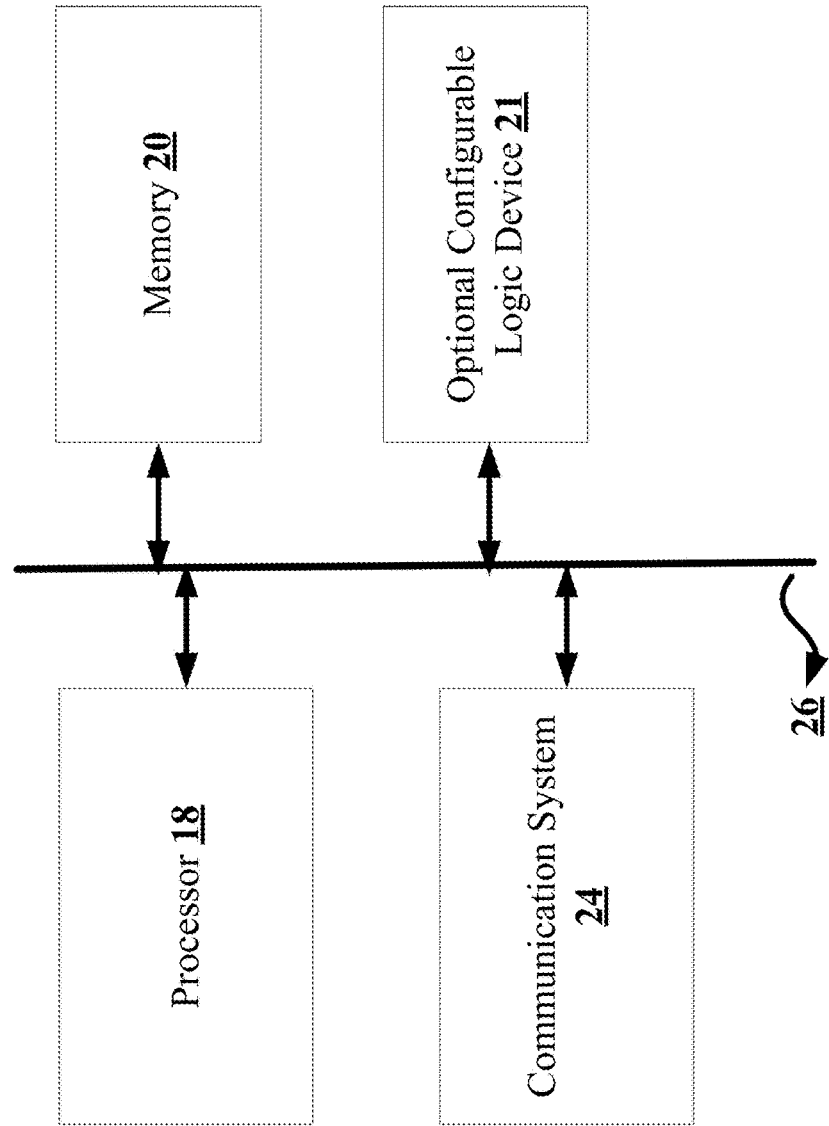
FIG. 2 is a block diagram of the application traffic manager computing device.

The application traffic manager computing device 14 assists with managing client defined response requirements in DNS query as illustrated and described with the examples herein, although application traffic manager computing device 14 may perform other types and numbers of functions. As illustrated in FIG. 2, the application traffic manager computing device 14 includes at least one processor 18, memory 20, optional configurable logic device 21, and communication system 24 which are coupled together by bus 26, although application traffic manager computing device 14 may comprise other types and numbers of elements in other configurations.

At least one processor 18 may execute one or more computer-executable instructions stored in the memory 20 for the methods illustrated and described with reference to the examples herein, although the at least one processor can execute other types and numbers of instructions and perform other types and numbers of operations. The at least one processor 18 may comprise one or more central processing units ("CPUs") or general purpose processors with one or more processing cores, such as AMD® processor(s), although other types of processor(s) could be used (e.g., Intel®).

Figure 3:
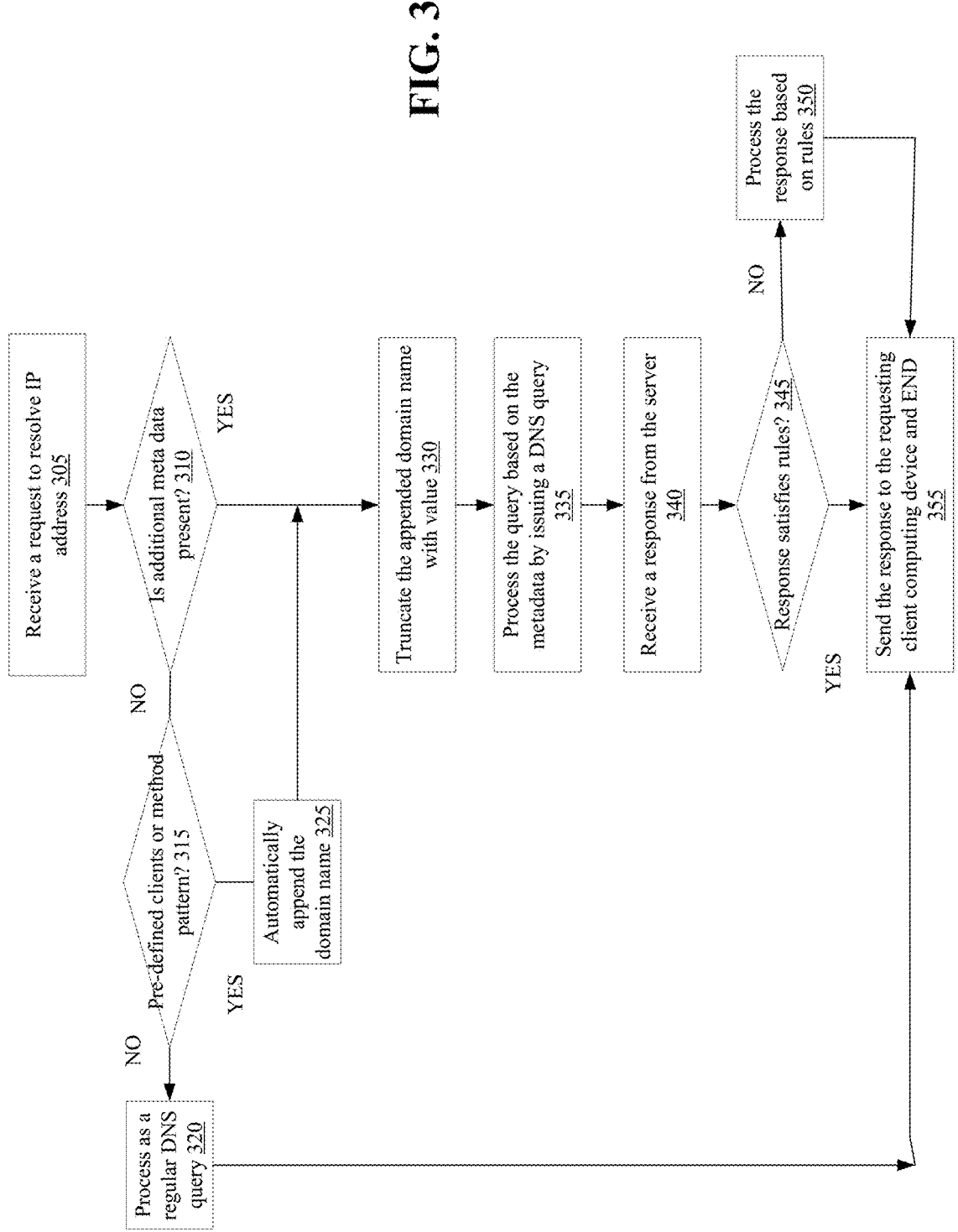
FIG. 3 is a flowchart of an exemplary method for managing client defined response requirements in DNS query.

Memory 20 may comprise one or more tangible storage media, such as RAM, ROM, flash memory, CD-ROM, floppy disk, hard disk drive(s), solid state memory, DVD, or any other memory storage types or devices, including combinations thereof, which are known to those of ordinary skill in the art. Memory 20 may store one or more non-transitory computer-readable instructions of this technology as illustrated and described with reference to the examples herein that may be executed by the at least one processor 18. The flow chart shown in FIG. 3 is representative of example steps or actions of this technology that may be embodied or expressed as one or more non-transitory computer or machine readable instructions stored in memory 20 that may be executed by the at least one processor 18 and/or may be implemented by configured logic in the optional configurable logic device 21.

The optional configurable logic device 21 may comprise specialized hardware configured to implement one or more steps of this technology as illustrated and described with reference to the examples herein. By way of example only, the optional configurable logic device 21 may comprise one or more of field programmable gate arrays ("FPGAs"), field programmable logic devices ("FPLDs"), application specific integrated circuits (ASICs") and/or programmable logic units ("PLUs").

The communication system 24 in the application traffic manager computing device 14 is used to operatively couple and communicate between the application traffic manager computing device 14 and the plurality of client computing devices 12, and the plurality of servers 16 which are all coupled together by communication network 30 such as one or more local area networks (LAN) and/or the wide area network (WAN), although other types and numbers of communication networks or systems with other types and numbers of connections and configurations to other devices and elements. By way of example only, the communication network such as local area networks (LAN) and the wide area network (WAN) can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus in this example, although other bus types and links may be used, such as PCI.

Each of the plurality of client computing devices 12, include a central processing unit (CPU) or processor, a memory, input device, display device, optional configurable logic device and a communication system, which are coupled together by a bus or other link. Each of the plurality of client computing devices 12, in this example, may run interface applications, such as Web browsers, that may provide an interface to make queries for and send data to different server devices via the application traffic manager computing device 14, although other types of application may also run on each of the plurality of client computing devices 12.

Each of the plurality of servers 16 include a central processing unit (CPU) or processor, a memory, and a communication system, which are coupled together by a bus or other link, although other numbers and types of network devices could be used. Generally, the plurality of servers 16 process queries received from querying one of the plurality of client computing devices 12 via communication network 30 according to the HTTP-based application RFC protocol or the CIFS or NFS protocol in this example, but the principles discussed herein are not limited to this example and can include other application protocols. Additionally, a series of applications may run on the plurality of servers 16 that allow the transmission of data, such as a data file or metadata, queried by the plurality of client computing devices 12. The plurality of servers 16 may provide data or receive data in response to queries directed toward the respective applications on the plurality of servers 16 from the plurality of client computing devices 12. It is to be understood that the plurality of servers 16 may be hardware or software or may represent a system with multiple servers, which may include internal or external networks. In this example the plurality of servers 16 may be any version of Microsoft® IIS servers or Apache® servers, although other types of servers may be used.

Although an exemplary network environment 10 with the plurality of client computing devices 12, the application traffic manager computing device 14, and the plurality of servers 16, communication network 30 are described and illustrated herein, other types and numbers of systems, devices, blades, components, and elements in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, 3G traffic networks, Public Switched Telephone Network (PSTNs), Packet Data Networks (PDNs), the Internet, intranets, and combinations thereof.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein. An exemplary method for managing client defined response requirements in DNS query will now be described with reference to FIGS. 1-4.

Figure 4:
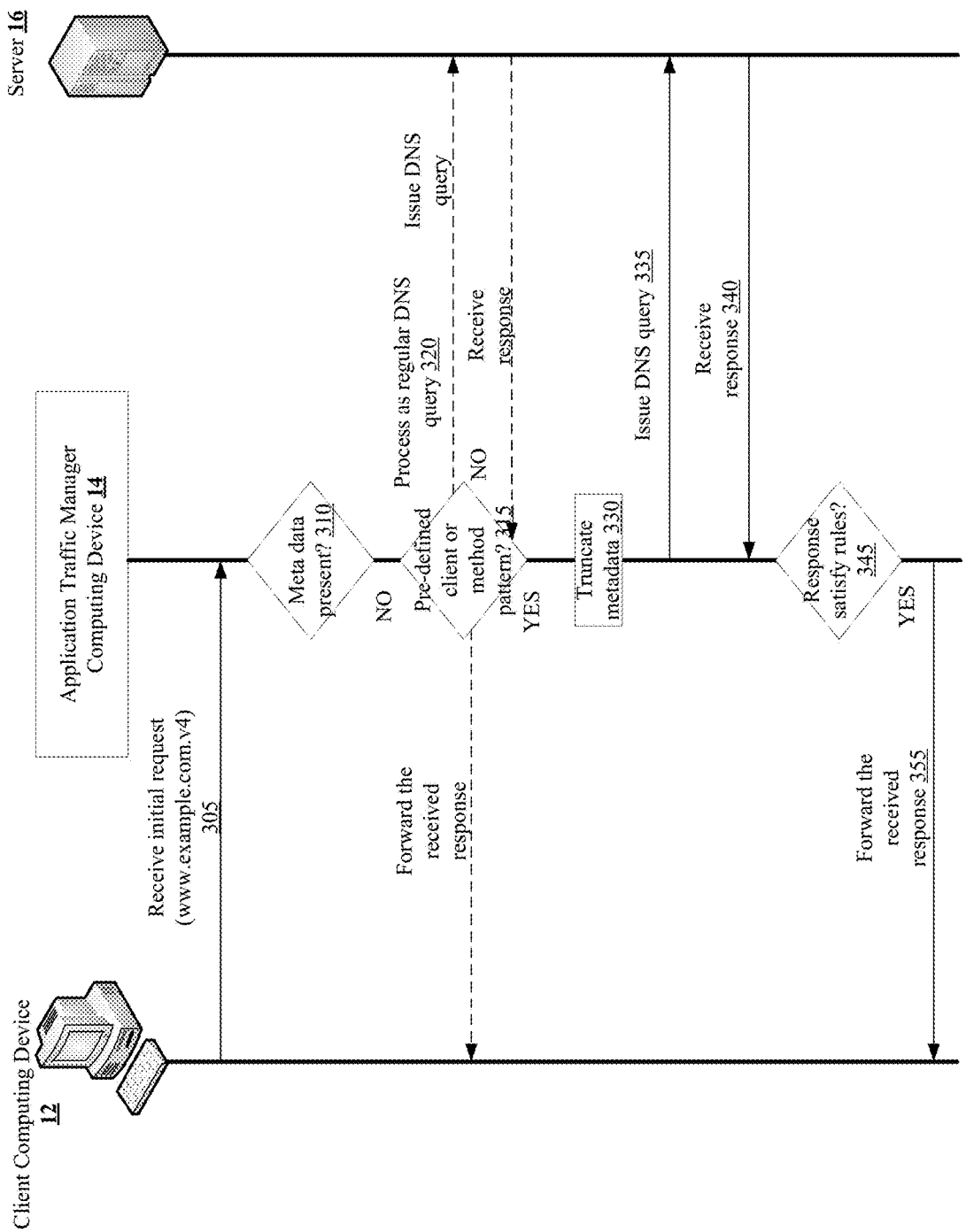
FIG. 4 is an exemplary timing diagram illustrating method for managing client defined response requirements in DNS query.

Particularly with reference to FIGS. 3-4, in step 305 application traffic manager computing device 14 receives a receives a query to resolve a hostname from a domain name resolver residing within the requesting one of the plurality of client computing devices 12. In this example, the application executing on the querying one of the plurality of client computing devices 12 appends the domain name with the value indicating the type of the internet protocol version by suffixing the value, although the value can also be encoded in other ways while sending the DNS query to resolve the hostname portion. By way of example only, the value indicating the type of version of the internet protocol address may be internet protocol address version 4 (IPv4) or internet protocol address version 6 (IPv6). For further illustration, the uniform resource locator with the value indicating the type of the internet protocol version can be http://www.example.com.v4/. Optionally, the client computing device can populate a host header in the HTTP request with the application name where the application name matches with the application name configured on the plurality of servers 16.

In step 310, the application traffic manager computing device 14 determines if the received DNS query includes the metadata in form of a domain name with the value indicating the type of internet protocol version. In this example, the application traffic manager computing device 14 parses the received DNS query to identify the value indicating the type of internet protocol version thereby determining the presence of the metadata, although the application traffic manager computing device 14 can use other techniques for determine the metadata. If the application traffic manager computing device 14 determines that the received DNS query includes the domain name with the value indicating the type of internet protocol version, then the Yes branch is taken to step 330 as illustrated and described below. However, if the application traffic manager computing device 14 determines that the received DNS query does not include the domain name with the value indicating the type of internet protocol version, then the No branch is taken to step 315. Alternatively, the application traffic manager computing device 14 may query the application executing on the querying one of the plurality of client computing devices 12 to include the domain name with the value indicating the type of internet protocol version when the application traffic manager computing device 14 determines that the received DNS query does not include the meta data in form of the domain name and the value.

In step 315, the application traffic manager computing device 14 determines if the querying one of the plurality of client computing devices 12 is in a pre-defined list of client devices. By way of example only, the application traffic manager computing device 14 determines by identifying the internet protocol (IP) address of the querying one of the plurality of client computing device 12 and comparing the IP address against the pre-defined list of client devices, although the application traffic manager computing device 14 can use other techniques. Alternatively, the application traffic manager computing device 14 can also determine if the querying one of the plurality of client computing devices 12 by querying for a pre-defined method. If the application traffic manager computing device 14 determines that the querying one of the plurality of client computing devices 12 is not present in the pre-defined list of client devices, then the No branch is taken to step 320.

In step 320, the application traffic manager computing device 14 processes the query as a regular DNS query and the exemplary process ends at step 355.

However, if in step 315 the application traffic manager computing device 14 determines that the querying one of the plurality of client computing devices 12 is present in a pre-defined list of client devices or methods, then the Yes branch is taken to step 325.

In step 325, the application traffic manager computing device 14 proceeds to automatically append the domain name with the value to the DNS query on a pre-defined domain name and value assigned to the querying client computing devices, although the application traffic manager computing device 14 can append the domain name with the value based on other parameters such as pre-defined methods.

Next, in step 330, the application traffic manager computing device 14 processes the query by truncating the appended domain name with the value indicating the type of internet protocol version. By way of example only, the application traffic manager computing device 14 truncates .v4 from www.example.com.v4. However, if the query also includes the application name, the application traffic manager computing device 14 does not alter the application name.

In step 335, based on the truncated domain name with the value indicating the type of internet protocol version, the application traffic manager computing device 14 selects a server among the plurality of servers 16 and issues a domain name system (DNS) query to the selected server of the plurality of servers, although the application traffic manager computing device 14 can select and issue to DNS query using any other parameters present in the received DNS query.

In step 340, the application traffic manager computing device 14 receives a response in the form of an internet protocol address from the selected server of the plurality of servers 16 in a format similar to the value indicating the type of internet protocol version, although the application traffic manager computing device can receive any amounts of any other information from the selected server. In this example, the application traffic manager computing device receives the internet protocol address in a version 4 format from the selected server of the plurality of servers 16.

Alternatively, in another example, the application traffic manager computing device 14 may receive the internet protocol address from the selected server of the plurality of servers 16 in a format different to the value indicating the type of internet protocol version when the value indicating the type of internet protocol version is not present in the selected server of the plurality of servers 16. By way of example only, the application traffic manager computing device may receive the internet protocol address in version 4 format, although the value indicating the type of internet protocol address may be for a version 6 format. When the application traffic manager computing device 14 receives the internet protocol address in a different format, the application traffic manager computing device 14 can select other servers of the plurality of servers to issue the DNS query and to obtain the internet protocol address in a format similar to the one indicated in the value.

In step 345, the application traffic manager computing device 14 determines whether the received format of the internet protocol address conforms to a policy present within the memory 20, although the policies can be stored at any other locations. In this example, the policies can relate to instructions set forth by a company or an organization. For purpose of illustration, the exemplary policy can relate to allowing only IP address in version IPv4 format even if the value type indicates IPv6 format, although any other types and amounts of policies can be present within the memory 20. Accordingly, if the application traffic manager computing device 14 determines that the received format of the internet protocol address does not conform to the policy present within the memory 20, a No branch is taken to step 350.

In step 350, the application traffic manager computing device 14 processes the response perform further actions based on rules present within the memory. By way of example only, one of the rules can relate to querying a different server among the plurality of servers 16 to obtain the internet protocol address similar to the value type. Alternatively, another exemplary rule can relate to forwarding the received internet protocol address in the same format as received, although there can be any other rules to assist the application traffic manager computing device 14 with taking necessary actions on the received response.

However, if in step 345 the application network traffic manager computing device 14 determines that the received format of the internet protocol address conforms to the policy, then a Yes branch is taken to step 355.

In step 355, the application traffic manager computing device 14 sends the internet protocol address back to the querying domain name system resolver present within the querying one of the plurality of client computing devices 12. The domain name system resolver forwards the received internet protocol address to the querying application residing within the querying one of the plurality of client computing devices 12 and the exemplary process ends. In this example, the application traffic manager computing device 14 sends the received internet protocol address back to the querying one of the plurality of client computing devices 12 as received internet protocol address is in IPv4 format which conforms to the policy.

Accordingly, as illustrated and described with the examples herein, this technology more effectively assists with managing client defined response requirements in a domain name system query. By truncating and process the received DNS queries, this technology provides an efficient and reliable process to determine whether to forward the received query to the DNS server. Additionally, upon receiving the response from the DNS server, this technology provides the flexibility to alter the received response, reject the received response or provide the response to the querying client device.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for managing client defined response requirements in a domain name system (DNS) query implemented by a network traffic management system comprising one or more network traffic apparatuses, client devices, or server devices, the method comprising:
   determining when a DNS request to resolve a hostname comprises a domain name with a value indicating a type of internet protocol version;
   truncating the internet protocol version value from the DNS request when the domain name and the internet protocol version value is present and prior to querying at least one of a plurality of servers for an internet protocol address associated with the DNS request;
   receiving the internet protocol address from the at least one of a plurality of servers;
   determining when a format of the received internet protocol address conforms to one or more policies; and
   performing one or more actions based on the determination of the conformance of the received internet protocol address.

2. The method as set forth in claim 1 further comprising selecting the at least one of the plurality of servers to receive the internet protocol address based on the truncated portion of the domain name with the value indicating type of internet protocol version.

3. The method as set forth in claim 1 wherein the determining the received query to resolve the hostname further comprises:
   determining when a querying client is present within a pre-defined list when the domain name with the value indicating the type of internet protocol version is determined to be absent in the received query; and
   appending a pre-defined value indicating a type of internet protocol version when the querying client computing device is determined to be present in the pre-defined list.

4. The method as set forth in claim 1 wherein the determining if the format of the received internet protocol address conforms to the one or more policies further comprises processing the received response to perform one or more actions based on one or more rules when the internet protocol address is determined to be non-conforming to the one or more policies.

5. The method as set forth in claim 1 wherein the determining if the format of the received internet protocol address further comprises providing the received internet protocol address to the querying client computing device without taking any of the one or more actions when the format of the received internet protocol address is determined to be conforming to the one or more policies.

6. The method as set forth in claim 1, wherein the internet protocol version value comprises at least one of IPv4 or IPv6.

7. The method as set forth in claim 1, wherein the internet protocol version is appended to the domain name or is included in a host header in an HTTP request.

8. The method as set forth in claim 1 further comprising, requesting a client to provide the internet protocol version value when the internet protocol version value is not present in the DNS request.

9. A non-transitory computer readable medium having stored thereon instructions managing client defined response requirements in a domain name system query comprising machine executable code which when executed by at least one processor, causes the processor to:
   determine when a DNS request to resolve a hostname comprises a domain name with a value indicating a type of internet protocol version;
   truncate the internet protocol version value from the DNS request when the domain name and the internet protocol version value is present and prior to querying at least one of a plurality of servers for an internet protocol address associated with the DNS request;
   receive the internet protocol address from the at least one of a plurality of servers;
   determine when a format of the received internet protocol address conforms to one or more policies; and
   perform one or more actions based on the determination of the conformance of the received internet protocol address.

10. The medium as set forth in claim 9 further comprising select the at least one of the plurality of servers to receive the internet protocol address based on the truncated portion of the domain name with the value indicating type of internet protocol version.

11. The medium as set forth in claim 9 wherein the determining the received query to resolve the hostname further comprises:
   determine when a querying client is present within a pre-defined list when the domain name with the value indicating the type of internet protocol version is determined to be absent in the received query; and
   append a pre-defined value indicating a type of internet protocol version when the querying client computing device is determined to be present in the pre-defined list.

12. The medium as set forth in claim 9 wherein the determining if the format of the received internet protocol address conforms to the one or more policies further comprises process the received response to perform one or more actions based on one or more rules when the internet protocol address is determined to be non-conforming to the one or more policies.

13. The medium as set forth in claim 9 wherein the determining if the format of the received internet protocol address further comprises provide the received internet protocol address to the querying client computing device without taking any of the one or more actions when the format of the received internet protocol address is determined to be conforming to the one or more policies.

14. The medium as set forth in claim 9, wherein the internet protocol version value comprises at least one of IPv4 or IPv6.

15. The medium as set forth in claim 9, wherein the internet protocol version is appended to the domain name or is included in a host header in an HTTP request.

16. The medium as set forth in claim 9 further comprising, request a client to provide the internet protocol version value when the internet protocol version value is not present in the DNS request.

17. An application traffic manager apparatus comprising memory comprising programmed instructions stored in the memory and one or more processors configured to be capable of executing the programmed instructions stored in the memory to:
   determine when a DNS request to resolve a hostname comprises a domain name with a value indicating a type of internet protocol version;
   truncate the internet protocol version value from the DNS request when the domain name and the internet protocol version value is present and prior to querying at least one of a plurality of servers for an internet protocol address associated with the DNS request;
   receive the internet protocol address from the at least one of a plurality of servers;
   determine when a format of the received internet protocol address conforms to one or more policies; and
   perform one or more actions based on the determination of the conformance of the received internet protocol address.

18. The device as set forth in claim 17 wherein the one or more processors are further configured to be capable of executing the programmed instructions stored in the memory to select the at least one of the plurality of servers to receive the internet protocol address based on the truncated portion of the domain name with the value indicating type of internet protocol version.

19. The device as set forth in claim 17 wherein the one or more processors are further configured to be capable of executing the programmed instructions stored in the memory wherein determining the received query to resolve the hostname further comprises:
   determine when a querying client is present within a pre-defined list when the domain name with the value indicating the type of internet protocol version is determined to be absent in the received query; and append a pre-defined value indicating a type of internet protocol version when the querying client computing device is determined to be present in the pre-defined list.

20. The device as set forth in claim 17 wherein the one or more processors are further configured to be capable of executing the programmed instructions stored in the memory wherein for the determining if the format of the received internet protocol address conforms to the one or more policies further comprises process the received response to perform one or more actions based on one or more rules when the internet protocol address is determined to be non-conforming to the one or more policies.

21. The device as set forth in claim 17 wherein the one or more processors are further configured to be capable of executing the programmed instructions stored in the memory wherein determining if the format of the received internet protocol address further comprises providing the received internet protocol address to the querying client computing device without taking any of the one or more actions when the format of the received internet protocol address is determined to be conforming to the one or more policies.

22. The device as set forth in claim 17, wherein the internet protocol version value comprises at least one of IPv4 or IPv6.

23. The device as set forth in claim 17, wherein the internet protocol version is appended to the domain name or is included in a host header in an HTTP request.

24. The device as set forth in claim 17, wherein the one or more processors are further configured to be capable of executing the programmed instructions stored in the memory to request a client to provide the internet protocol version value when the internet protocol version value is not present in the DNS request.

* * * * *

UNITED STATES PATENT AND TRADEMARK OFFICE
CERTIFICATE OF CORRECTION

PATENT NO. : 9,838,259 B1
APPLICATION NO. : 14/203230
DATED : December 5, 2017
INVENTOR(S) : Bellhart et al.

Page 1 of 1

It is certified that error appears in the above-identified patent and that said Letters Patent is hereby corrected as shown below:

On the Title Page

At item (12) please delete "Earnhart et al." and insert --Bellhart et al.--.

At item (72) Inventors, please delete "Michael Earnhart" and insert --Michael Bellhart--.

Signed and Sealed this
Fourteenth Day of August, 2018

Andrei Iancu
*Director of the United States Patent and Trademark Office*